United States Patent [19]

Shimamura et al.

[11] Patent Number: 4,829,754
[45] Date of Patent: May 16, 1989

[54] FRONT MOWER

[75] Inventors: Teruo Shimamura; Takao Sakatsuji; Kazuo Furukawa, all of Osaka, Japan

[73] Assignee: Kubota Ltd., Osaka, Japan

[21] Appl. No.: 133,921

[22] Filed: Dec. 16, 1987

[30] Foreign Application Priority Data

Dec. 16, 1986 [JP] Japan ............... 61-193864[U]

[51] Int. Cl.⁴ .......................................... A01D 34/66
[52] U.S. Cl. ........................................... 56/15.9; 56/6
[58] Field of Search ................... 56/6, 7, 15.9, 16.2,
56/16.3, 208, DIG. 9, 15.8, 15.2, 15.6, 202, 13.3

[56] References Cited

U.S. PATENT DOCUMENTS

| | | | |
|---|---|---|---|
| 3,323,294 | 6/1967 | Kuepper | 56/15.9 |
| 3,469,376 | 9/1969 | Bacon | 56/6 |
| 3,619,996 | 11/1971 | Jacobson et al. | 56/13.6 |
| 3,680,292 | 11/1972 | McCanse | 56/15.8 |
| 3,702,051 | 11/1972 | Deines | 56/11.3 |
| 4,102,114 | 7/1978 | Estes et al. | 56/15.2 |
| 4,188,160 | 2/1980 | Corbett et al. | 56/13.3 |
| 4,325,211 | 4/1982 | Witt et al. | 56/15.8 |
| 4,563,019 | 1/1986 | Kuhn et al. | 56/15.9 |
| 4,573,306 | 3/1986 | Smith et al. | 56/10.4 |
| 4,715,168 | 12/1987 | Oxley | 56/15.8 |
| 4,735,037 | 4/1988 | Benter | 56/13.3 |
| 4,738,327 | 4/1988 | Takei | 56/6 |

Primary Examiner—John Weiss
Attorney, Agent, or Firm—Birch, Stewart, Kolasch & Birch

[57] ABSTRACT

A front mower includes a cutter unit having ground contact wheels and liftably attached to the front of a vehicle by a link assembly and a hydraulic piston-cylinder assembly for lifting or lowering the cutter unit. The link assembly includes a pair of first links each having a rear end pivoted to the vehicle and a pair of second links each having a front end pivoted to the deck of the mower, the front end of each first link being inflexibly and removably fixed to the rear end of each second link by a locking pin. A spring is provided between each first link and the vehicle. The cutter unit can be attached to and removed from the vehicle without removing the spring.

19 Claims, 9 Drawing Sheets

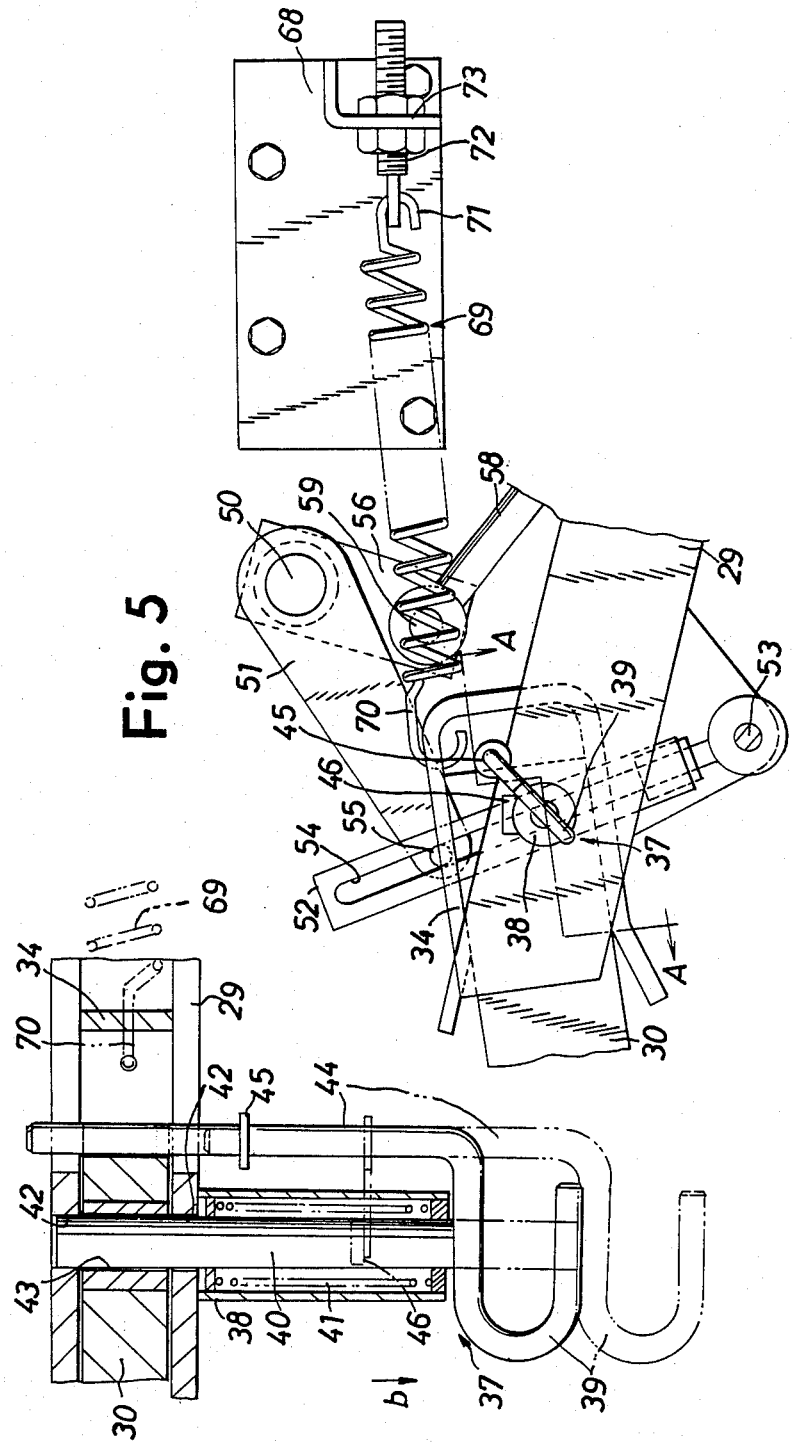

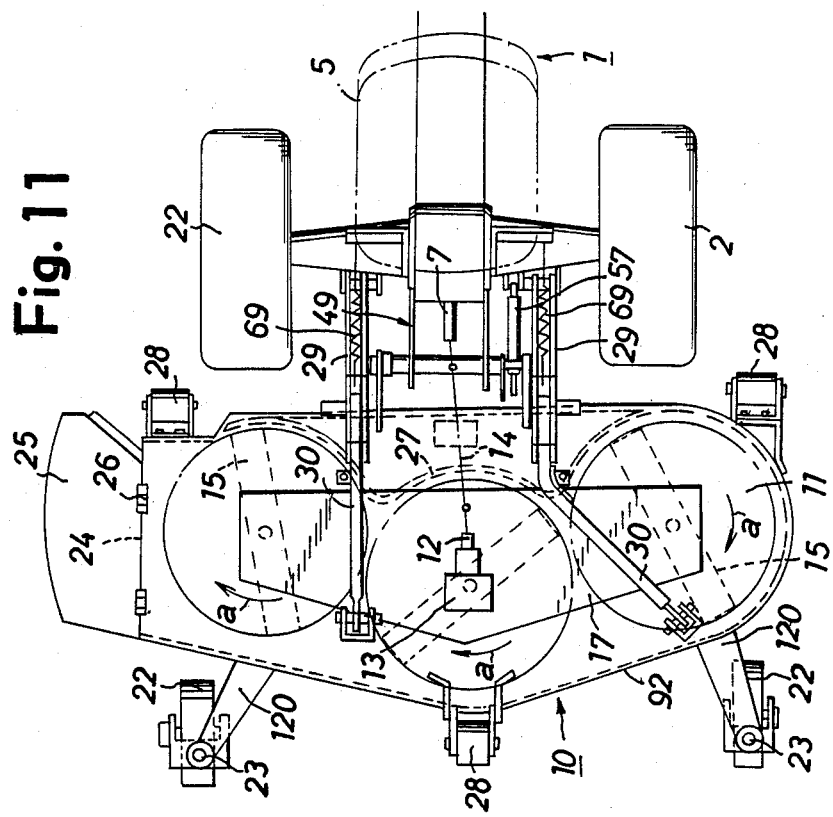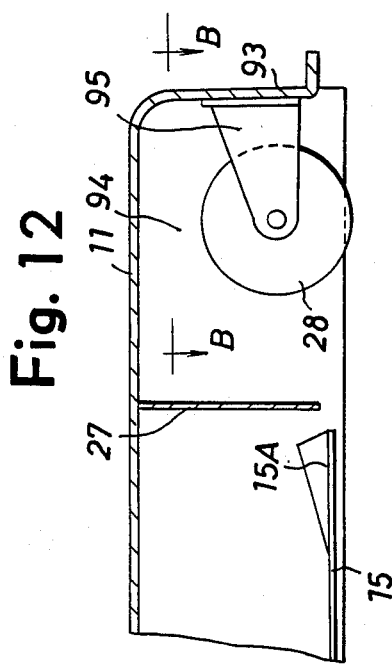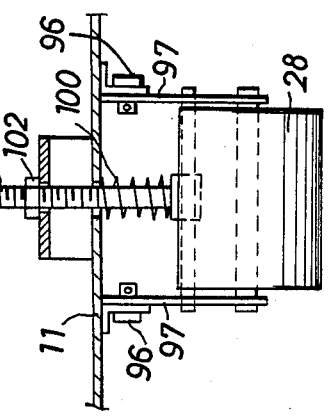

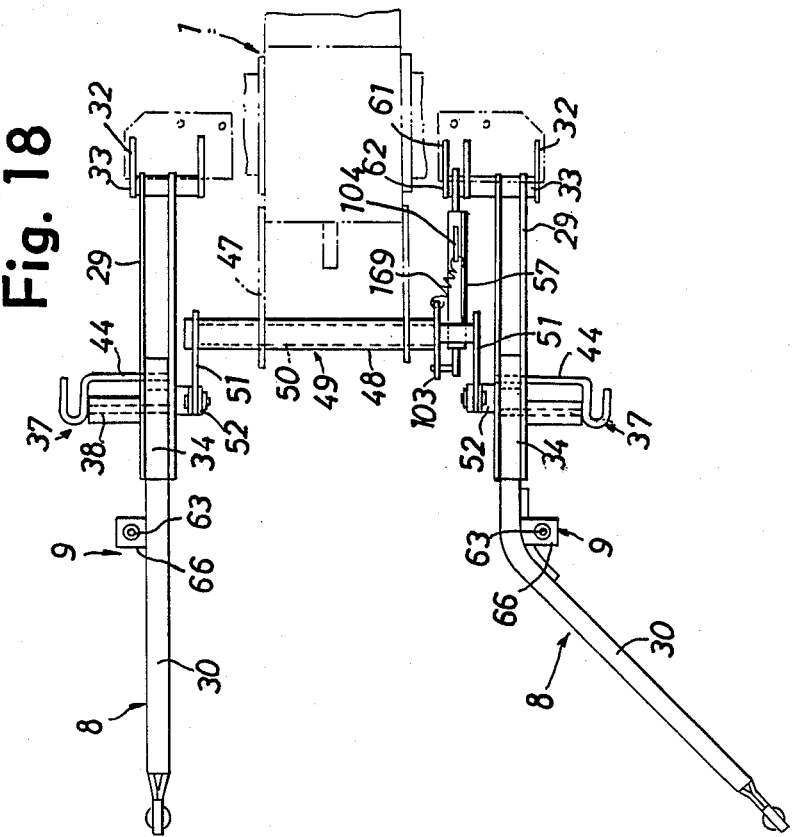
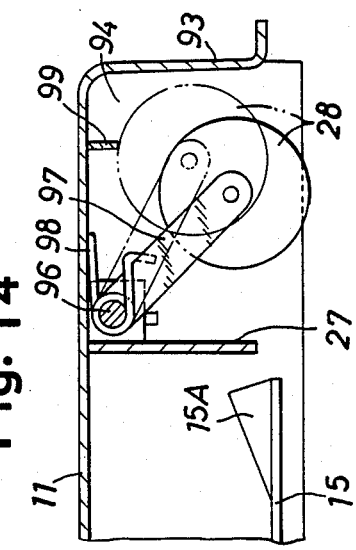
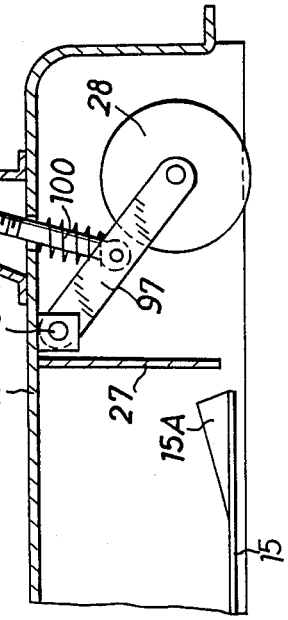

FRONT MOWER

FIELD OF THE INVENTION AND RELATED ART STATEMENT

The present invention relates to a front mower including a cutter unit liftably attached to the front of a vehicle for cutting grass or the like during running.

U.S. Pat. Nos. 4,325,211 to Witt et al, 3,619,996 to Jacobson et al and 3,702,051 to Deines disclose mowers which comprise a cutter unit having a pair of ground contact wheels at its opposite sides and attached to the front of a wheeled vehicle for following the ground, with tension springs extending between the cutter unit and the vehicle.

With these conventional mowers, the springs hold the cutter unit in a lifted position, alleviating the load on the ground contact wheels during working, rendering these wheels less likely to rut the ground and making the vehicle easy to steer with reduced resistance offered to the contact wheels. Moreover, the gravity on the cutter unit can be partially supported by the drive wheels of the vehicle to give enhanced traction, hence various advantages.

However, every time the cutter unit is to be changed, the springs provided between the unit and the vehicle must be removed and then reinstalled. Since the springs which are adapted to lift the cutter unit have a considerably great elastic force, this procedure is very cumbersome.

Further as disclosed in U.S. Pat. No. 3,619,996, the mower of the type described has three cutter blades arranged transversely of the vehicle, with the central cutter blade positioned slightly to the front of the other side blades so as not to leave any unmowed area. The mower deck is provided with a guide plate along the rear portion of the track for the rotation of each blade. Further, to prevent the cutter blades from scalping the ground, the cutter unit is provided with limit gauges at its respective sides in addition to the ground contact wheels.

Nevertheless, the pair of limit gauges are still unable to obviate the likelihood that the central cutter blade will scalp the ground because this blade is positioned slightly forward.

Further as disclosed in U.S. Pat. No. 4,114,353, it is desired that the front mower of the type described is adapted to transfer the cropped grass or clippings to a collection box by a blower.

The means for transmitting power to the blower is a belt which is left exposed and hence prone to damage or breakage and is low in durability. If it is attempted to drive the blower from the drive system for the cutter blades through a shaft having a universal joint, the shaft is likely to be an elongated one, which will strike on the step of the vehicle when the cutter unit is lifted, consequently limiting the level to which the cutter unit is liftable.

OBJECTS AND SUMMARY OF THE INVENTION

The present invention has been accomplished to overcome the foregoing problems heretofore encountered.

More specifically, a first object of the invention is to provide a front mower comprising a cutter unit which is attachable to and removable from a vehicle with springs installed in place and which is therefore made easy to change, the mower further having the basic advantages of being less likely to permit its ground contact wheels to rut the ground, rendering the vehicle smoother to steer and affording improved traction.

A second object of the invention is to provide a front mower having cutter blades which are completely prevented from scalping the ground, thereby being protected from damage.

A third object of the invention is to provide a front mower of the type described wherein a clipping discharge opening formed at one side of the cutter unit is provided with means for transferring clippings to a collection box, the clipping transferring means being operable through a shaft with a universal joint and yet permitting the lift of the cutter unit to a sufficient level.

A fourth object of the invention is to provide a front mower which is attachable to a vehicle with its cutter unit offset laterally toward one side with respect to the vehicle and which is thereby adapted to cut grass along a curved course while running.

Other objects, advantages and features of the invention will become apparent from the following description with reference to the accompanying drawings.

To fulfill the foregoing objects, the present invention provides a front mower including a cutter unit having ground contact wheels and being liftably the front of a vehicle by a link assembly and drive means for lifting or lowering the cutter unit. The link assembly includes a pair of opposite first links each having a rear end pivoted to the vehicle upwardly or downwardly movably, and a pair of opposite second links each having a front end pivoted to a mower deck. The front end of each first link is inflexibly and removably fixed to the rear end of each second link by locking means. A spring for biasing the cutter unit in a lifting direction is provided between and attached to each first link and the vehicle.

The invention further provides a front mower including a cutter unit having ground contact wheels and liftably attached to the front of a vehicle by a link assembly, drive means for lifting or lowering the cutter unit, a mower deck having a clipping discharge opening at its one side, a plurality of vertical shafts supported by the mower deck and each having a cutter, wrapping connector driving means reeved around the vertical shafts for one of the shafts to drive therethrough the other shafts as driven shafts, clipping transfer means provided at the clipping discharge opening and operable via the wrapping connector driving means, and limit gauges for preventing the cutters from scalping the ground, the front mower being characterized in that the link assembly comprises a pair of opposite first links each having a rear end pivoted to the vehicle upwardly or downwardly movably and a pair of opposite second links each having a front end pivoted to the mower deck, the front end of each first link being inflexibly and removably fixed to the rear end of each second link by locking means, a spring being provided between and attached to each first link and the vehicle for biasing the cutter unit in a lifting direction, a transmission case being mounted on the mower deck and disposed above one of the driven shafts positioned most proximate to the clipping discharge opening laterally outwardly of one of the pair of second links, the transmission case having a bevel gear mechanism housed therein and operable by said one driven shaft, the bevel gear mechanism being operatively connected to the clipping transfer means.

BRIEF DESCRIPTION OF THE DRAWINGS

FIG. 5 is a side elevation showing spring engaging portions in detal;

FIG. 6 is a view in section taken along the line A—A in FIG. 5;

FIG. 11 is a plan view showing ground contact wheels and limit gauges as attached or arranged in place;

FIG. 12 is a side elevation in section showing the limit gauge as mounted in place;

FIG. 14 is a side elevation in section showing a second example of the limit gauge mount assembly;

FIG. 15 is a rear view in section showing a third example of like assembly;

FIG. 16 is a side elevation in section of FIG. 15;

FIG. 18 is a plan view showing the same with the cutter unit omitted.

DESCRIPTION OF THE PREFERRED EMBODIMENTS

Figure 1:
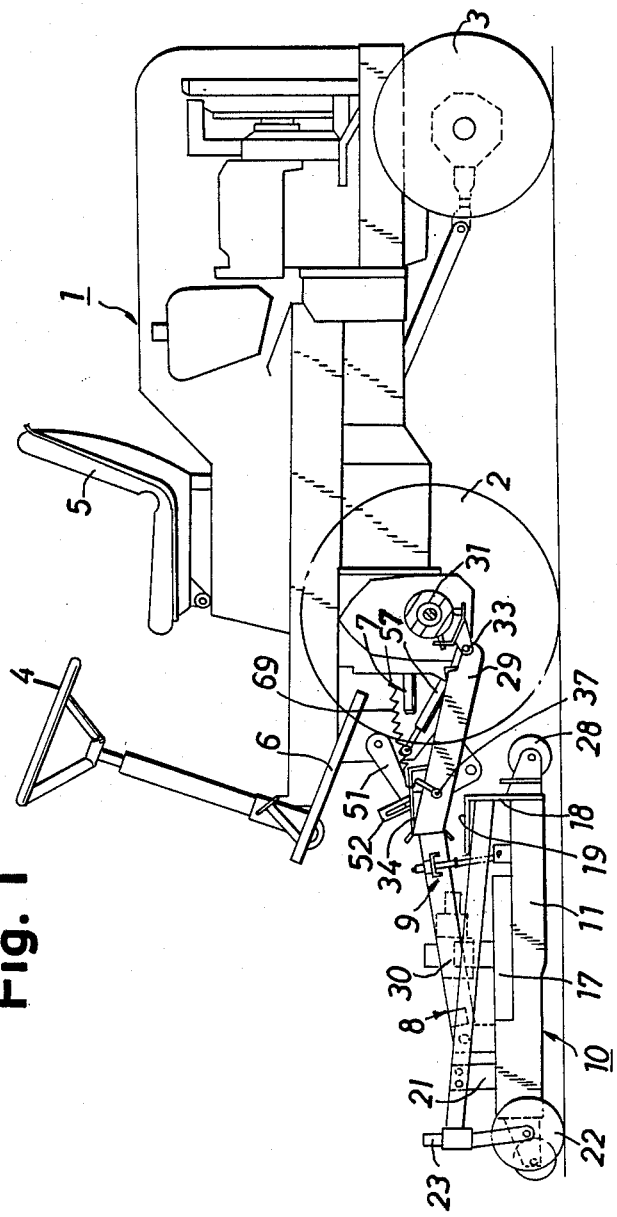
FIG. 1 is a side elevation showing a first embodiment of the invention in its entirety.
Figure 2:
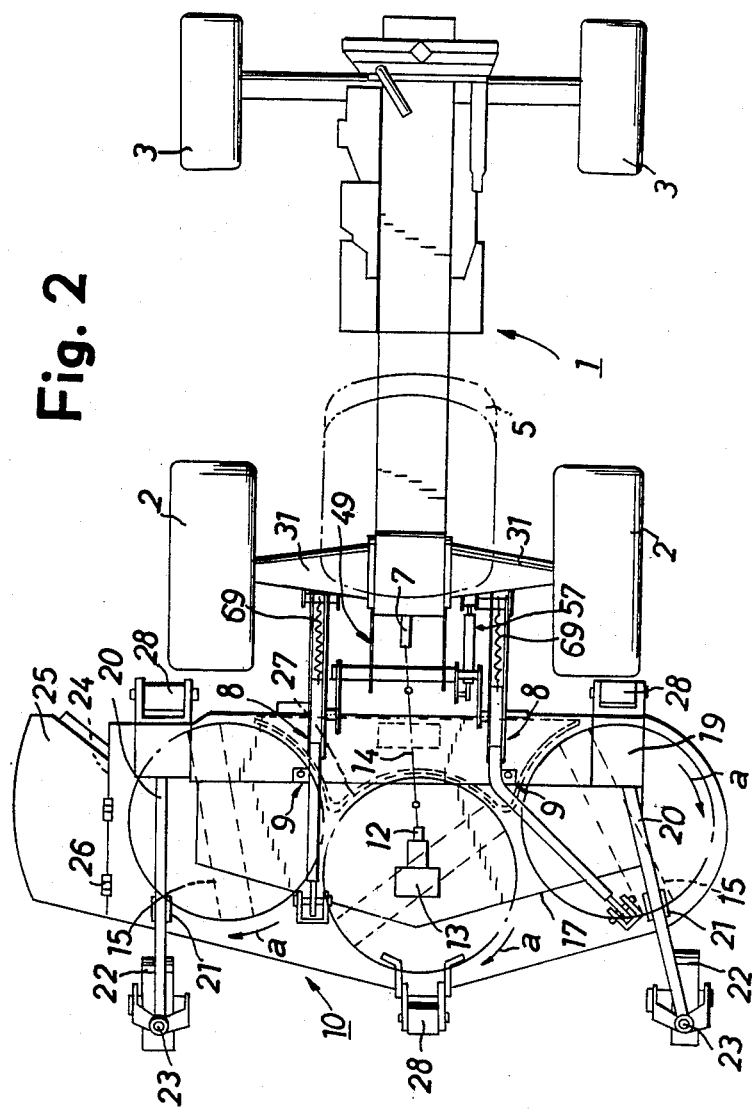
FIG. 2 is a plan view of the same.

With reference to FIGS. 1 and 2, a running vehicle 1 illustrated as a tractor is of the two-axle four-wheel type and has pairs of front wheels 2 and rear wheels 3 which are all drive wheels.

The rear wheels 3 serve also for steering.

The vehicle 1 has steering means comprising a steering wheel 4 and an operator's seat 5, a step 6 and a PTO shaft 7 projecting forward from the center of the front of the vehicle.

A cutter unit 10 is attached to the front of the vehicle 1 by a link assembly 8 and suspension assemblies 9. The cutter unit 10 has a mower deck 11 in the form of a box which is open at its bottom side. A transmission case 13 having a power input shaft 12 is fixedly mounted on the upper side of the deck 11 centrally thereof. The PTO shaft 7 is operatively connected to the power input shaft 12 by a universal joint shaft 14, whereby cutter blades 15 are rotated each about a vertical axis.

The cutter blades 15 are arranged laterally of the vehicle 1. The central blade 15 is positioned forwardly of the side blades 15. Although not shown in FIGS. 1 and 2, belt transmission means 16 shown in FIG. 9 rotates these cutter blades 15 each in the direction of arrow a shown in FIG. 2. The transmission means 16 is provided above the deck 11 and covered with a cover 17.

An upright angle member 18 is fixedly provided at the rear end of each lateral side of the mower deck 11 and has a horizontal top portion serving as a step 19 for use in attaching the cutter unit 10 to the vehicle 1.

The mower deck 11 is further provided at each side thereof with a stay 20 having a rear end bolted to the upright portion of the angle member 18 and a portion welded to the step 19. The stay 20 extends forward and carries at its forward end a ground contact wheel 22 of caster structure positioned in front of the deck. An intermediate portion of the stay 20 is bolted to a bracket 21 mounted on the upper side of the deck 11.

The pair of wheels 22 at the opposite sides serve as gauge wheels for adjusting the cutting level. A support bar 23 for the wheel 22 can be fixed to an adjustable level.

A clipping discharge opening 24 is formed in the mower deck 11 at one of its lateral sides, i.e. at the right side in the present embodiment. The edge of the deck defining the upper side of the opening 24 has attached thereto by a hinge 26 a guide cover 25 which is movable between a horizontal position and an upright position.

The mower deck 11 is provided on its inner side (underside) with a guide plate 27 having circular-arc portions along the tracks for the rotation of the cutter blades 15. When rotated in the direction of arrows a, the cutter blades 15 crop weeds, grass or the like, whereupon the clippings are sent to the discharge opening A limit gauge 28 for preventing the cutter blade 15 from scalping the ground is disposed in the rear of each blade 15. Similarly, a limit gauge 28 is provided in front of the central cutter blade 15.

Figure 3:
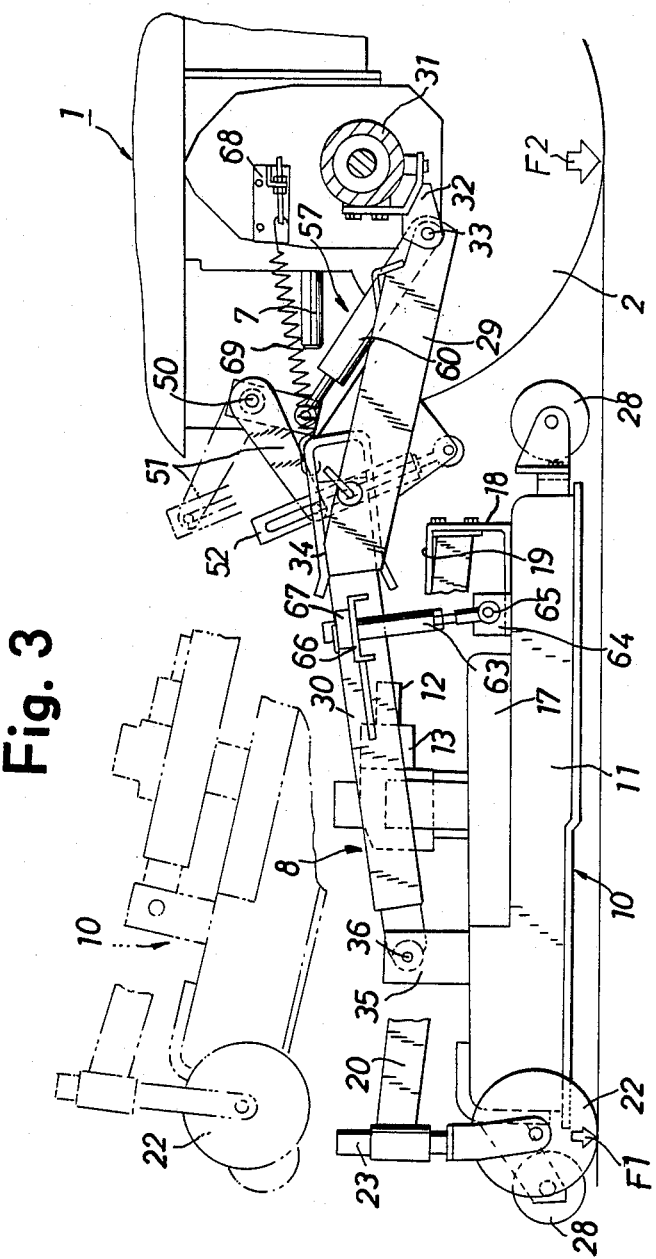
FIG. 3 is a side elevation showing a link assembly in detail.
Figure 4:
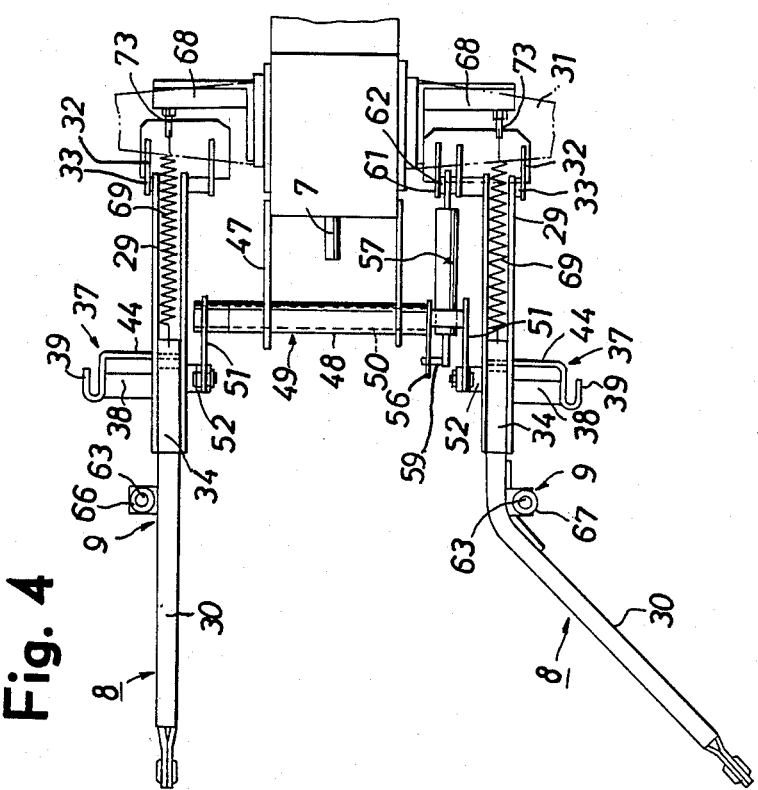
FIG. 4 is a plan view showing the same with a cutter unit omitted.

With reference to FIGS. 3 and 4, the link assembly 8 comprises a pair of first links 29 at opposite sides of the vehicle 1 and a pair of opposite second links 30. The rear end of each first link 29 is upwardly or downwardly movably supported by a lateral pin 33 on a bracket 32 attached to an axle case 31. The link 29 has a free (forward) end provided with a socket member 34 having an open front end and U-shaped when seen from one side.

Each second link 30 has at its front end a ball socket which is supported by a pin 36 on a bracket 35 on the mower deck 11. The rear end of the second link 30 is removably inserted into the socket member 34 from the front and fixed to the socket member by locking means 37 removably inserted through the member 34 and the link rear end laterally. Thus, the link 30 is fixed to the link 29 by the locking means 37 inflexibly and removably.

The locking means 37, which is shown in FIG. 6, has a tubular member 38 fixed to one side of each first link 29 and outwardly projecting therefrom, and a locking pin 40 having a knob 39 and removably inserted through the tubular member 38 laterally, the pin 40 being biased in the locking direction by a coiled spring 41. Holes 42 formed in the first link 29 are in register with a connecting hole 43 formed in the rear end of the second link 30, and the locking pin 40 is further inserted through these holes, whereby the second link 30 is removably connected to the first link 29. The upper and lower sides of the second link rear end are restrained by the socket member 34, whereby the two links are made inflexible.

The knob 39 extends into a rod 44 in parallel with the locking pin 40 for preventing the pin 40 from rotation. With the second link 30 connected to the first link 29, the rod 44 bears on the upper side of the first link 29, holding the pin 40 against rotation. When the locking pin 40 and the rod 44 are withdrawn against the spring 41 in the direction of arrow b shown in FIG. 6 to engage a flange 45 on the preventing rod 44 with a retaining piece 46 on the tubular member 38, the locking pin 34 is held in a position, rendering the second link disconnectable from the first link. The locking means 37 can be handled by the operator in the manner described above by manipulating the knob 39 with hand by his feet placed on the steps 19.

When the mower is in position for mowing, the first links 29 are inclined forwardly upward, while the second links 30 are inclinded forwardly downward. When seen from above, the pair of first links 29 extend straight in parallel to each other longitudinally of the vehicle, and one of the second links 30 extends straight with the other second link 30 bent laterally outward toward its front end. As seen in FIG. 2, the cutter unit 10 is offset toward the bent direction with respect to the vehicle 1 and thereby adapted to readily cut grass or the like along a curved course while running.

With reference to FIG. 4, the front portion of the vehicle 1 is fixedly provided with a support frame 49 which comprises a pair of opposed connecting plates 47 and a tubular member 48 connected between the plates 47 and extending transversely of the vehicle. A rod 50 rotatably extending through the tubular member 48 has fixedly fitted to each end thereof a boss portion of a lifting arm 51. A pair of arms 51 extend forward and are movable upward and downward about the rod 50.

As shown in FIG. 5, a suspension member 52 is pivoted at its lower end to each first link 29 by a pin 53. The suspension member 52 is formed with a slot 54, in which a lateral pin 55 on the forward end of the lifting arm 51 is slidably engaged.

With reference to FIGS. 3 to 5, one of the lifting arms 51 is fixedly provided with a downward arm 56 positioned inwardly thereof. The outer end of the piston rod 58 of a double-acting hydraulic cylinder 57 is pivoted to the downward arm 56 by a pin 59.

The hydraulic cylinder 57 has a cylinder tube 60 which is pivoted by a lateral pin 62 to a bracket 61 attached to the axle case 31. The advance of the piston rod 58 causes the lift arms 51, 51, suspension members 52, suspension assemblies 9 and link assembly 8 to lift the cutter unit 10 in its entirety as indicated in broken lines in FIG. 3. Thus, the hydraulic cylinder 57 serves as means for lifting and lowering the unit 10.

To render the cutter unit 10 liftable as above with diminished distortion, the lateral pins 33 about which the link assembly 8 is pivotally movable upward or downward are in alignment with the lateral pin 62 for pivoting the hydraulic cylinder 57 to the vehicle 1.

With reference to FIGS. 3 and 4, the pair of suspension assemblies 9 connect the respective second links 30 each at a portion thereof close to the rear end to the mower deck 11 so as to restrict the downward movement of the cutter unit 10 while rendering the unit free to move upward.

More specifically, a suspension rod 63 made adjustable by a threaded structure is pivoted at its lower end to a bracket 64 on the mower deck 11 by a pin 65. The suspension rod 63 is upwardly or downwardly movably inserted through a bracket 66 attached to the outer side of the second link 30. A shock absorbing rubber collar 67 bearing on the bracket 66 is shiftably fixed to the rod 63 at a portion thereof close to its upper end. The rubber collar 67 serves to mitigate the impact.

With reference to FIGS. 3 to 6, a spring 69 for biasing the cutter unit 10 toward the lifting direction is provided between and attached to the socket member 34 on each first link 29 and a bracket 68 secured to the vehicle 1.

The spring 69 has hooked ends 70 and 71. The hook 70 is engaged with a socket member 34, and the other hook 71 with a support member 73 adjustably provided on the bracket 68 by a screw structure 72 to make the intensity of the elastic force of the spring 69 adjustable. Thus, the forces of the springs 69 are made adjustable in accordance with the loads acting on opposite sides of the cutter unit 10.

Each spring 69, which is in the form of a coiled tension spring, extends substantially with the same forwardly downward inclination as the second link 30 when the mower is positioned for operation. Further as seen in FIG. 4, the spring 69 is positioned within the lateral width of the first link 29.

Consequently, while the mower is in operation with the wheels 22 of the cutter unit 10 rolling on the ground, the springs 69 elastically act to lessen the load F1 on the wheels 22 and to increase the load F2 on the drive wheels 2.

The preferred embodiment of the invention shown in FIGS. 7 to 10 has the following means in addition to the basic construction already described with reference to FIG. 1 to 6. Throughout FIGS. 1 to 10, like parts are designated by like reference numerals.

The transmission case 13 mounted on the mower deck 11 houses therein a bevel gear mechanism 74. A belt 77 serving as the transmission means 16 is reeved around pulleys 76 mounted on respective cutter shafts 74, whereby the three cutter blades 15 are rotated in the direction of arrows a shown in FIG. 9. Indicated at 78 is a tension pulley.

Figure 9:
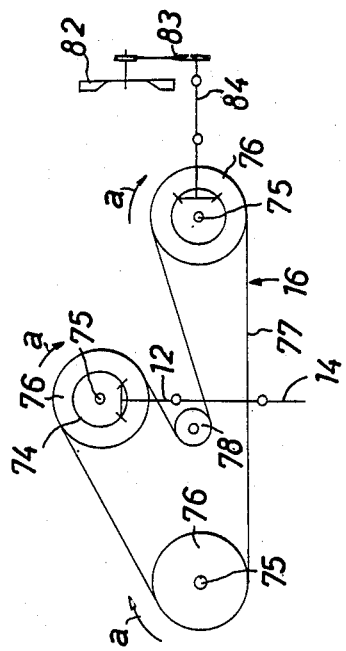
FIG. 9 is a diagram showing a transmission system for cutters and the clipping transfer means.

The cutter transmission means shown in FIG. 9 is included also in the embodiment of FIG. 1 to 6.

The cover 25 for the clipping discharge opening 24 is removed or held upright as supported by the hinge 26. The opening 24 is provided with clipping transfer means 79, which comprises a blower case 81 having an outlet 80 and an impeller 82 supported by the case 81 and rotatable about a lateral axis. The impeller is driven by a universal joint shaft 84 via a wrapping connector 83. The power to be transmitted to the connector 83 via the shaft 84 is delivered from the cutter transmission means 16.

Figure 7:
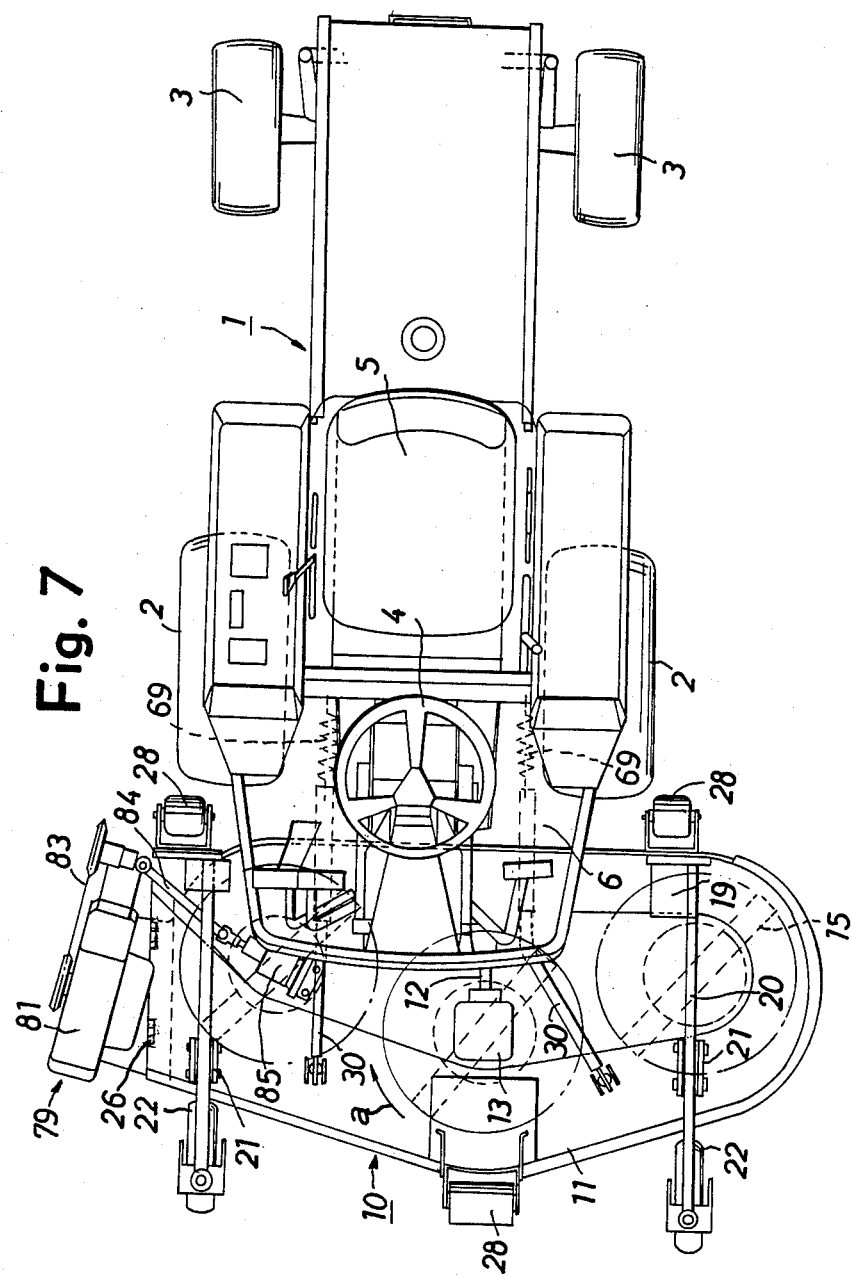
FIG. 7 is an overall plan view showing the embodiment as provided with clipping transfer means.
Figure 13:
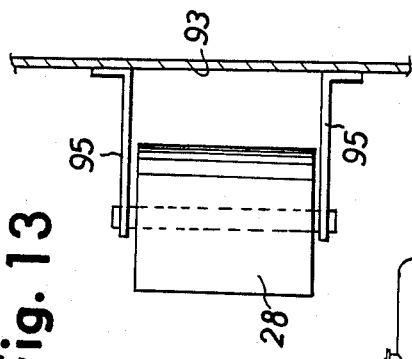
FIG. 13 is a view in section taken along the line B—B in FIG. 12.
Figure 8:
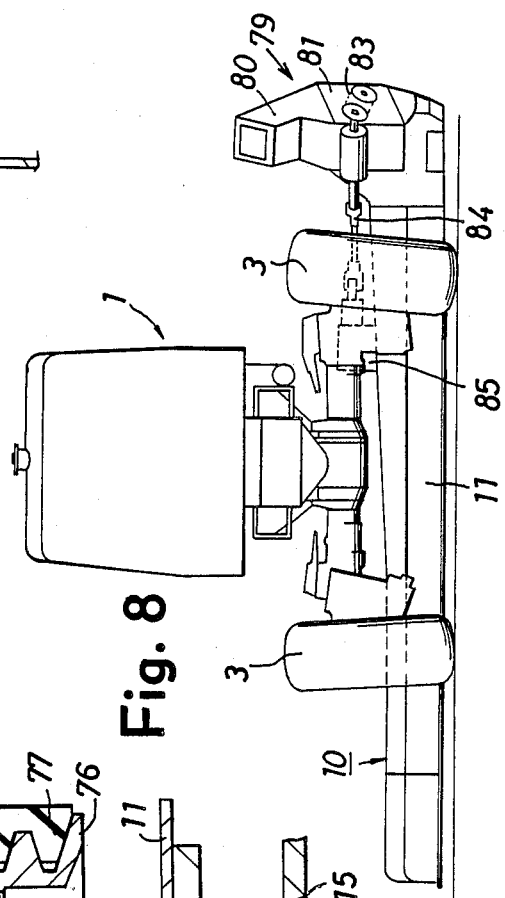
FIG. 8 is a rear view of the same.

More specifically stated with reference to FIG. 7, an intermediate transmission case 85 mounted on the mower deck 11 by a bracket 86 is disposed above the cutter shaft 75 which is positioned most proximate to the clipping discharge opening 24 laterally outwardly of the link assembly 8.

Figure 10:
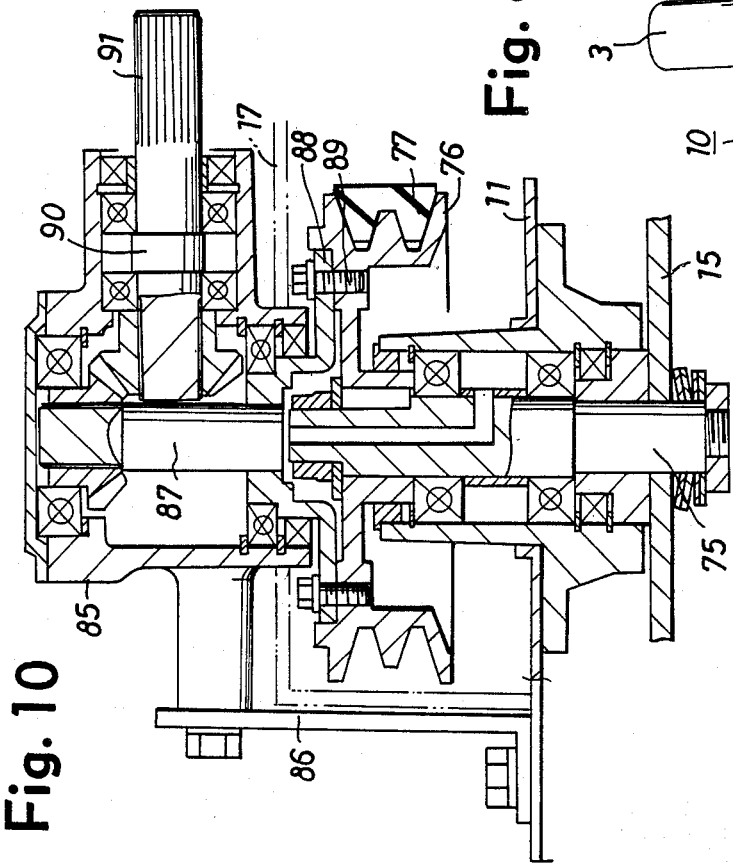
FIG. 10 is a sectional view showing an intermediate transmission assembly for the clipping transfer means in detail.

As seen in FIG. 10, the intermediate transmission case 85 houses the bevel gear mechanism 74. A vertical bevel gear shaft 87 in alignment with the cutter shaft 75 is fixed to the upper side of the pulley 76 by a flange 88 and bolts 89. When seen from above as in FIG. 7, a bevel gear shaft 90 extends laterally outward as inclined rearward and is splined as at 91 at its outer end as shown in FIG. 10. The splined end 91 is operatively connected to the wrapping connector 83 by the universal joint shaft 84. Consequently, the grass or the like cropped by the cutter means of the cutter unit 10 is transferred from the outlet 80 of the transfer means 79 to a clipping collector box or the like (now shown) via a duct.

FIGS. 11 to 16 show an improved arrangement for attaching each of opposite ground contact wheels 22 to the mower deck 11, as well as one for attaching the central limit gauge 28. With the exception of this feature, the construction shown is similar to the one already described with reference to FIGS. 1 to 6. Throughout these drawings concerned, like parts are designated by like reference numerals.

With reference to FIG. 11, a stay 120 for the ground contact wheel 22 extends forward from and is fixed to an upright wall 92 at the front end of the mower deck 11.

The central limit gauge 28 is disposed within a space 94 between the rear wall 93 of the mower deck 11 and the guide plate 27 extending along the track for the rotation of the cutter blade having an air stirring blade portion 15A. The gauge 28 is rotatably supported by brackets 95.

FIG. 14 shows a modified arrangement for the limit gauge 28. The gauge wheel 28 is rotatably supported by a stay 97 pivotally movable about a pin 96 and biased by a spring 98 in a direction to bring the wheel 28 toward the ground. A scraper 99 is provided for removing extraneous matter from the outer periphery of the gauge wheel 28.

FIGS. 15 and 16 show another embodiment, in which a screw rod 101 carrying a coiled spring 100 therearound is pivoted to a pivotable stay 97. The screw rod 101 extends upward through the mower deck 11, and a nut 102 is screwed on the rod 101.

Figure 17:
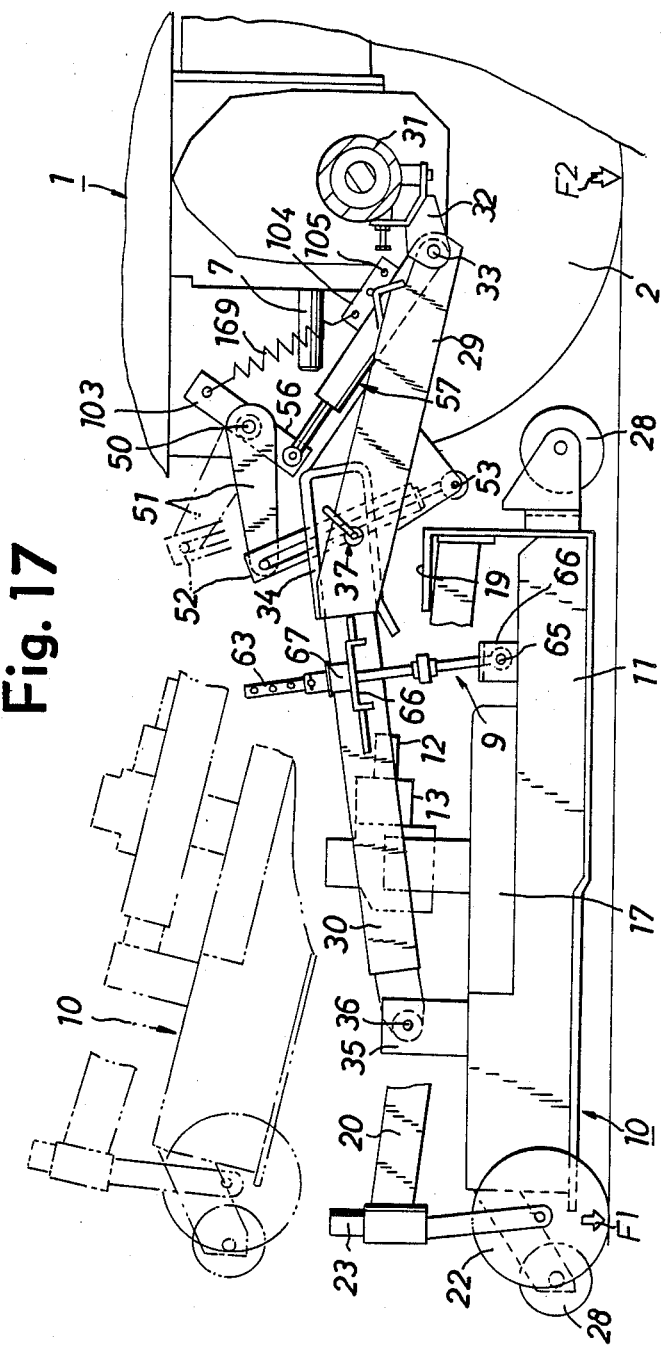
FIG. 17 is a side elevation showing a second embodiment of the invention.

FIGS. 17 and 18 show another embodiment wherein the lifting arm 56 has an upward extension 103. A spring 169 for biasing the cutter unit 10 toward the lifting direction is provided between and attached to the extension 103 and a bracket 104 attached to the cylinder tube 60.

Thus, the spring 169 extends from the lifting arm assembly 51 to the lifting-lowering drive means 57 according to the embodiment of FIGS. 17 and 18. The spring 169 serves the same function as those shown in FIGS. 1 to 6.

With the embodiment of FIGS. 17 and 18, the piston of the cylinder 57 is oil-locked against extension or retraction during a mowing operation, such that the piston of the hydraulic cylinder 57 is advanced when lifting the cutter unit 10. The spring 169 assists in extending the piston. With this embodiment the bracket 104 has a plurality of engaging portions 105, and the spring 169 is engaged by a selected one of these portions 105, whereby the force of the spring is adjustable.

While several embodiments of the invention have been described above for illustrative purposes, the mover of the invention can be modified as stated below.

The spring for biasing the cutter unit can be a compression spring. A single spring may be provided between the vehicle and a member interconnecting the first links of the link assembly. A pair of lifting-lowering drive means may be provided at opposite sides of the vehicle instead of the single means. The cutter means of the cutter unit, which is a blade, may be in the form of a disk, drum or the like.

What is claimed is:

1. A front mower comprising:
   a cutter unit having ground contact wheels and being liftably attached to the front of a vehicle by a link assembly;
   drive means for lifting or lowering the cutting unit;
   said link assembly including a pair of opposite first links each having a rear end pivotable upward or downward with respect to the vehicle, and a pair of opposite second links each having a front end pivoted to a mower deck;
   locking means for inflexibly and removably fixing the front end of each first link to the rear end of each second link; and
   a spring provided between and attached to each first link and the vehicle;
   wherein the ground contact wheels are provided in a pair as opposed to each other laterally of the vehicle at the front side of the mower deck and roll on the ground while the mower is in condition for working, the link assembly being so positioned in this state that the pair of first links are inclined forwardly upward with the pair of second links inclined forwardly downward, the springs being provided in a pair at the respective sides of the vehicle and extending approximately with the same forwardly downward inclination as the second links.

2. A front mower as defined in claim 1 wherein when seen from above, the pair of first links and one of the second links extend straight longitudinally of the vehicle, and the other second link is bent laterally outward toward its front end, whereby the cutter unit is offset toward the bent direction with respect to the vehicle, the spring extending straight longitudinally of the vehicle within the lateral width of the first link.

3. A front mower as defined in claim 1 wherein a socket member having an open front end and U-shaped when seen from one side is attached to the front end of each first link, and the rear end of the second link is removably inserted in the socket member longitudinally of the vehicle, the locking means for removably fixing the inserted second link end to the first link comprises a locking pin removably insertable into the inserted end and the socket member laterally from outside and a spring biasing the locking pin in the direction of insertion, the spring having a front end engaged with the socket member and a rear end engaged with a support member fixed to the vehicle by a screw bolt adjustable longitudinally of the vehicle.

4. A front mower as defined in claim 1 wherein the spring is a tension spring.

5. A front mower comprising:
   a cutter unit having ground contact wheels and being liftably attached to the front of a vehicle by a link assembly;
   drive means for lifting or lowering the cutter unit;
   a mower deck having a clipping discharge opening at one side;
   a plurality of vertical shafts supported by the mower deck and each having a cutter;
   wrapping connector drive means, reeved around the vertical shafts, for one of the plurality of shafts to drive therethrough the other shafts as driven shafts;
   clipping transfer means provided at the clipping discharge opening and operable via the wrapping connector drive means;
   limit gauges for preventing the cutters from scalping the ground;
   said link assembly including a pair of opposite first links each having a rear end pivotably connected to the vehicle and movable upward or downward, and a pair of opposite second links each having a front end pivotably connected to the mower deck, the front end of each first link being inflexibly and removably fixed to the rear of each second link by locking means;

a spring provided between and attached to each first link for biasing the cutter unit in a lifting direction;

a transmission case mounted on the mower deck and disposed above one of the driven shafts positioned most proximate to the clipping discharge opening laterally outwardly of one of the pair of second links, the transmission case having a bevel gear mechanism housed therein and operable by said one driven shaft, the bevel gear mechanism being operatively connected to the clipping transfer means;

wherein the cutters are disposed at each of the central portion and opposite side portions of the cutter unit, and the central cutter is positioned forwardly of the side cutters, the limit gauge for each of the side cutters being attached to the mower deck at the rear side of the side cutter, the limit gauge for the central cutter being disposed inside the mower deck at the rear side of the central cutter; and wherein the limit gauge for the central cutter is upwardly or downwardly movably attached to the mower deck by a stay and is biased downward by a spring, the central limit gauge being provided with a scraper for removing a deposit therefrom.

6. A front mower as defined in claim 5 wherein one side of the cutter unit opposite to the other side thereof where the clipping discharge opening is provided is offset laterally outward with respect to the vehicle.

7. A front mower mounted in front of a vehicle by a link assembly to liftably hold a cutter unit having ground wheels comprising:

drive means for powering the displacement of the cutter unit up or down;

a spring operatively connected to the cutter unit for biasing the cutter unit normally upward;

said link assembly including the connection of first and second links, a pair of said first links each having a rear end displaceably pivotable up and down with respect to the vehicle and a pair of said second links each having a front end pivotably connected to a mower deck; and locking means for inflexibly and removably connecting the first link as its front end and the second link at its rear end;

said spring being bridged between the first link and the vehicle to urge the first link upward whereby the urging effect of the spring enables attachment or detachment of the cutter unit with the aid of said locking means.

8. A front mower according to claim 7, wherein the pair of first links and one of the second links are arranged in a longitudinally straight line and another member of the second links has a front end bent outward and to the side such that the cutter unit is offset from the vehicle longitudinally in the bent direction, and wherein a pair of springs are each arranged in a longitudinally straight line and within a transversal space of the paired first links.

9. A front mower according to claim 7, wherein the spring is a tension spring.

10. A front mower mounted in front of a vehicle by a link assembly to liftably hold a cutter unit having ground wheels, comprising:

drive means for powering an up and down displacement of the cutter unit;

a spring operatively connected to said cutter unit for normally biasing the cutter unit upward;

said link assembly including a connection for first links and second links, a pair of said first links each having a rear end displaceably pivotable up and down relative to the vehicle, a pair of said second links each having a front end pivotably connected to a mower deck;

locking means for inflexibly and removably connecting a first link at its front end and a second link at its rear end;

a pair of ground wheels mounted in front of the mower deck for following the ground surface during operation of the mower;

said first links being forwardly and upwardly inclined while connected to the rear of said second links via said locking means, and said second links being forwardly and downwardly inclined during operation of the mower;

said spring being bridged between the first link and the vehicle to urge the first link upward whereby the urging effect of the spring enables attachment or detachment of the cutter unit with the aid of said locking means, wherein a pair of springs are each bridged in a downwardly inclined and foward manner with an inclination approximately equal to the second links.

11. A front mower mounted in front of a vehicle by a link assembly to liftably hold a cutter unit having ground wheels, comprising:

drive means for powering an up and down displacement of the cutter unit;

a spring for normally biasing the cutter unit upward;

said link assembly including a connection for first and second links, a pair of said first links each having a rear end displaceably pivotable up and down relative to the vehicle, a pair of said second links each having a front end pivotably connected to a mower deck;

a socket member positioned at each front end of the paired first links, said socket member being shaped to have an open front and U-shaped section attached to removably receive longitudinally thereof a rear end of a second link member;

locking means for removably holding the received second link, said locking means including a locking pin removably insertable into the connection for at least the second link and a spring to urge the locking pin into the connection;

wherein each of the paired springs has a front hook end engaged to the socket member and has a rear hook end engaged to a support member mounted on the vehicle with a screw bolt adjustable longitudinally, wherein the spring is bridged between the first link and the vehicle to urge the first link upward whereby the urging effect of the spring enables attachment or detachment of the cutter unit with the aid of said locking means.

12. A front mower mounted in front of a vehicle by a link assembly to liftably hold a cutter unit having ground wheels, comprising:

drive means for powering an up and down displacement of the cutter unit;

a spring operatively connected to said cutter unit for normally biasing the cutter unit upward;

a mower deck having a clipping discharge opening at one side and a plurality of vertical shafts acting as a driver and the remaining ones of said plurality of shafts each with a cutter;

belt transmission means entraining the plurality of vertical shafts for transmitting power to the vertical shafts, one of said plurality of vertical shafts acting as a driver and the remaining ones of said plurality of shafts being followers;

clipping transfer means provided at a discharge opening of said cutter means for transferring clippings to the exterior of the cutter unit, said clipping transfer means being driven via the belt transmission means;

a limit gauge for preventing a cutter from scalping ground soil;

said link assembly including a connection for first and second links, a pair of first links each having a rear end displaceably pivotable up and down relative to the vehicle, a pair of second links each having a front end pivotably connected to the mower deck;

locking means for inflexibly and removably connecting the first link at its front end and the second link at its rear end;

said spring being bridged between the first link and the vehicle to urge the first link upward whereby the urging effect of the spring enables attachment or detachment of the cutter unit with the aid of said locking means;

a transmission case disposed on the mower deck in a position most adjacent the discharge opening and also above a follower vertical shaft located outwardly to the side of one of the paired second links;

a beveled gearing mounted in the transmission case; and shaft drive means for drive-connecting the beveled gearing and clipping transfer means.

13. A front mower according to claim 12, wherein the cutter unit includes a central cutter and two side cutters, the central cutter being disposed forward of the two side cutters, and wherein a limit gauge is mounted in the rear of each of the two side cutters for cutting on the mower deck.

14. A front mower according to claim 12, wherein the limit gauge is mounted with the aid of a stay for movement up and down on the mower deck, said limit gauge being biased downward by a spring and provided with a scraper to remove a deposit while the limit gauge is up.

15. A front mower according to claim 12, wherein the limit gauge is mounted with a stay to be movable up and down on the mower deck and is biased downward by a spring and is provided with a scraper to remove a deposit while the limit gauge is up.

16. A front mower mounted in front of a vehicle by a link assembly to liftably hold a cutter unit having ground wheels, comprising:

drive means for powering an up and down displacement of the cutter unit;

a spring operatively connected to said cutter unit for normally biasing the cutter unit upward;

said link assembly including a connection for first and second links, a pair of first links each having a rear end displaceably pivotable up and down relative to the vehicle, a pair of second links each having a front end pivotably connected to a mower deck;

locking means for inflexibly and removably connecting the first link at its front end and the second link at its rear end; and a lifting arm mechanism mounted on the vehicle for displacing up or down the paired first links with a drive connection to a cylinder;

said spring being bridged between the lifting arm mechanism and the drive cylinder to urge upward such that the urging effect of the spring enables attachment or detachment of the cutter unit with the aid of said locking means.

17. A front mower according to claim 16, wherein the drive means includes a cylinder tube and retractably mounted piston rod, said cylinder tube being pivoted on the vehicle and the piston rod being pivoted on the lifting arm mechanism, and an engaging member provided with the cylinder tube for adjusting resilient intensity of the spring.

18. A front mower mounted in front of a vehicle by a link assembly to liftably hold a cutter unit having ground wheels, comprising:

drive means for powering an up and down displacement of the cutter unit;

a spring for normally biasing the cutter unit upward;

said link assembly including a connection for first and second links, a pair of first links each having a rear end displaceably pivotable up and down relative to the vehicle, and a pair of second links each having a front end pivotably connected to a mower deck;

locking means for inflexibly and pivotably connecting the first link at its front end and the second link at its rear end;

said spring being bridged between the first link and the vehicle to urge upward such that the urging effect of the spring enables attachment or detachment of the cutter unit with the aid of the locking means;

a suspension assembly provided for each second link, said suspension assembly having a rod pivoted on the mower deck; and a buffer provided enabling the cutter to move freely upward and controllably downward.

19. A front mower according to claim 18, wherein the means provided for displacing the cutter unit up or down with the aid of the link assembly and the suspension assembly is provided between the vehicle and the link assembly, said means including additional means for permitting the cutter unit to be inclined longitudinally or transversely by independent action of the link assembly.

* * * * *